United States Patent
Ge (10) Patent No.: US 6,693,715 B2
(45) Date of Patent: Feb. 17, 2004

(54) FRINGE ANALYSIS METHOD USING FOURIER TRANSFORM

(75) Inventor: Zongtao Ge, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 631 days.

(21) Appl. No.: 09/732,921

(22) Filed: Dec. 11, 2000

(65) Prior Publication Data

US 2001/0049709 A1 Dec. 6, 2001

(30) Foreign Application Priority Data

Dec. 21, 1999 (JP) .......................................... 11-363241

(51) Int. Cl.$^7$ ............................................... G01B 9/02
(52) U.S. Cl. ....................................................... 356/512
(58) Field of Search ................................. 356/450, 512, 356/513, 514; 382/280

(56) References Cited

U.S. PATENT DOCUMENTS 6,532,073 B2 * 3/2003 Ge ................................ 356/512
6,621,579 B2 * 9/2003 Ge ................................ 356/512

OTHER PUBLICATIONS

Takeda, Mitsuo, "Subfringe Interferometry Fundamentals," *Kogaku*, pp. 55–65, vol. 13, No. 1, Feb. 1984.

* cited by examiner

*Primary Examiner*—Samuel A. Turner
*Assistant Examiner*—Michael A. Lyons
(74) *Attorney, Agent, or Firm*—Snider & Associates; Ronald R. Snider (57) ABSTRACT

When analyzing the fringe pattern of an object to be observed by using Fourier transform method with respect to closed interference fringe image data, the original data expressed by an orthogonal coordinate system are once converted into fringe image data represented by a polar coordinate system, the converted data are analyzed by the conventional Fourier transform method, and then the resulted data are converted back into the original orthogonal coordinate system by inverse coordinate transformation, so as to obtain the wavefront corresponding to the original wavefront to be observed.

11 Claims, 8 Drawing Sheets

FRINGE ANALYSIS METHOD USING FOURIER TRANSFORM

RELATED APPLICATIONS

This application claims the priority of Japanese Patent Application No. 11-363241 filed on Dec. 21, 1999, which is incorporated herein by reference.

BACKGROUND OF THE INVENTION

1. Field of the Invention

The present invention relates to a fringe analysis method using Fourier transform; and, in particular, to a fringe analysis method which can effectively use the Fourier transform method even when analyzing image data having a closed fringe pattern such as interference fringe pattern.

2. Description of the Prior Art

While the light wave interferometry has conventionally been known as an important means concerning precise measurement of object surfaces, there have been urgent demands for developing an interferometry technique (sub-fringe interferometry) which can read out information items smaller than a single stripe of interference fringe (one fringe) due to the necessity for measuring a surface or wavefront aberration at an accuracy of $1/10$ wavelength or higher.

For sub-fringe interferometry techniques, attention has been paid to those using the Fourier transform technique as described in "Basics of sub-fringe interferometry," Kogaku, Vol. 13, No. 1, pp. 55–65, February, 1984.

However, though excellent in principle, the Fourier transform method leaves some problems unsolved, and have not always been effectively used in practice.

One of such problems lies in how to adapt the Fourier transform method to a closed fringe pattern.

Namely, while interference fringe pattern exhibits a pattern shaped like closed concentric circles when an object to be observed has a shape approximating a spherical or parabolic surface, it is difficult for a lower frequency signal component and a carrier frequency component (which is superimposed in the Fourier transform method since the surface to be observed and the reference surface are relatively tilted with each other) to be securely separated from each other in Fourier spectra plane when the Fourier transform method is used for such closed interference fringe pattern. Therefore, the original phase or wavefront can not be recovered (by the conventional Fourier transform method).

SUMMARY OF THE INVENTION

In view of the circumstances mentioned above, it is an object of the present invention to provide a fringe analysis method using Fourier transform which can securely separate the low frequency signal component and the carrier frequency component from each other in Fourier spectra plane when a fringe analysis is carried out for closed fringe image data by use of the Fourier transform method.

The present invention provides a fringe analysis method comprising the steps of converting fringe image data of a wavefront to be observed which are expressed by an orthogonal coordinate system into fringe image data represented by a different coordinate system; by using the conventional Fourier transform method, wavefront expressed in the converted coordinate system can be obtained; and then converting the obtained wavefront in the converted coordinate system back into a wavefront expressed in the original orthogonal coordinate system.

Preferably, the different coordinate system is a polar coordinate system.

Preferably, the fringe image data expressed by the orthogonal coordinate system comprise a closed fringe pattern, the origin of the polar coordinate system is set within the innermost of the closed fringe pattern.

Preferably, the origin is located near the center of the closed fringe pattern.

It will particularly be effective if the fringe analysis method using the Fourier transform in accordance with the present invention is applied to fringe image data carrying phase information and including carrier fringes superimposed thereon.

In particular, the present invention is effective in the case where the fringe image data are interference fringe image data, and carrier fringes caused by tilting the surface of the wavefront or the reference surface relatively with each other is superimposed on the interference fringe image data. Also, the present invention is considerably effective when the fringe image data are image data of moiré fringe pattern or other fringe pattern.

Preferably, ineffective data areas of the fringe image data represented by the converted coordinate system are filled by interpolation, and then the conventional Fourier transform method is applied to.

Preferably, the fringe image data represented by the converted coordinate system is multiplied by a predetermined window function.

Preferably, the fringe image data expressed by the orthogonal coordinate system is divided into a plurality of data areas, each of thus divided areas is converted into fringe image data represented by a converted coordinate system, conventional Fourier transform method is used so as to obtain wavefront corresponding to each area of the wavefront to be observed in the converted coordinate system, and then wavefronts of the plurality of areas represented by the converted coordinate system are combined together.

Preferably, the divided areas comprise a first angle area of $0 \leq \theta < \pi$ and a second angle area of $\pi \leq \theta 2\pi$.

It is also preferred that the divided areas comprise a first angle area of $$0 \leq \theta < \frac{\pi}{2},$$

a second angle area of $$\frac{\pi}{2} \leq \theta < \pi,$$

a third angle area of $$\pi \leq \theta < \frac{3\pi}{2},$$

and a fourth angle area of $$\frac{3\pi}{2} \leq \theta < 2\pi.$$

DESCRIPTION OF THE PREFERRED EMBODIMENTS

In the following, the method in accordance with an embodiment of the present invention will be explained in detail with reference to the drawings.

In this method, when analyzing the interferogram of an object to be observed by using the Fourier transform method with respect to closed interference fringe image data, the original image data expressed by an orthogonal coordinate system are once converted into fringe image data represented by a polar coordinate system; thus converted data are analyzed by the conventional Fourier transform method; and then the obtained wavefront is converted back into the orthogonal coordinate system by inverse polar coordinate transformation so as to obtain the original wavefront of the object to be observed. As a consequence, the method makes it possible to securely separate the lower frequency signal components from mixed signals of low frequency signal components and carrier frequency components in the Fourier spectrum.

Figure 2:
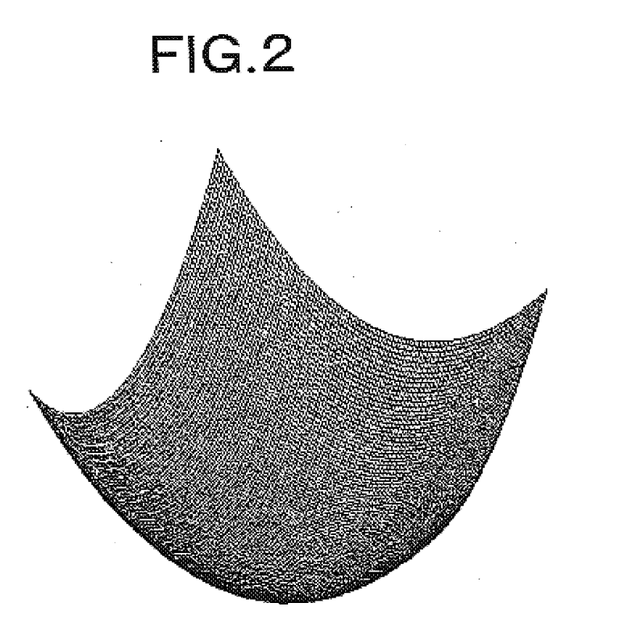
FIG. 2 is a schematic view showing a wavefront of an object (shaped like a spherical waveform) to be observed.
Figure 3:
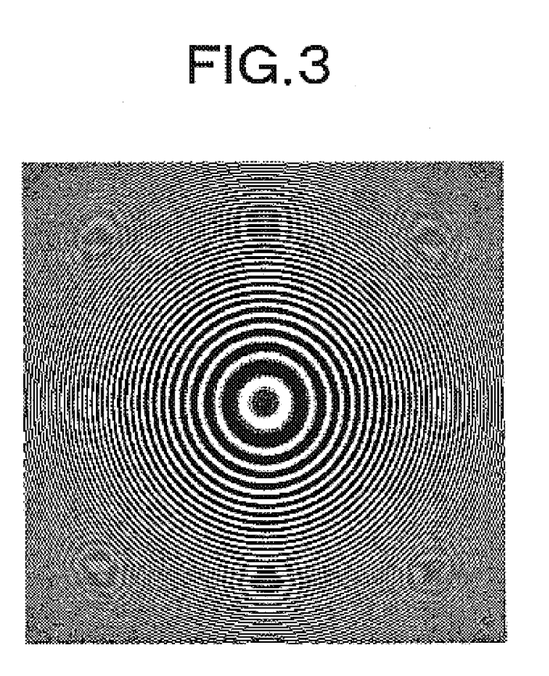
FIG. 3 is a view showing closed interference fringe pattern obtained from the wavefront shown in FIG. 2.

Studied in the following is a case where an object to be observed having a spherical wavefront such as that shown in FIG. 2 is measured with an interferometer, whereby interference fringe pattern such as those shown in FIG. 3 are obtained.

Figure 4:
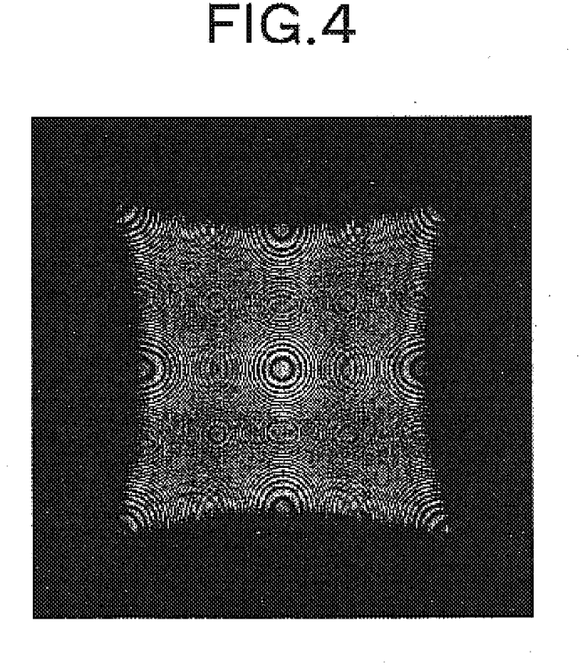
FIG. 4 is a view showing a Fourier spectrum obtained when the image data of the interference fringe pattern shown in FIG. 3 are Fourier-transformed as they are.

As can be seen from FIG. 3, interference fringe pattern is composed by closed rings in such a spherical object to be observed. The same holds when the object has a shape approximating a parabolic surface, for example. When such interference fringe pattern is analyzed by use of conventional Fourier transform method, a Fourier spectrum shown in FIG. 4 is obtained. As can be seen from FIG. 4, ring-like patterns are spread out over the Fourier spectrum as well, whereby it is difficult in principle for a normal Fourier transform analysis technique to securely separate a low frequency signal component and a carrier frequency component from each other.

Figure 5:
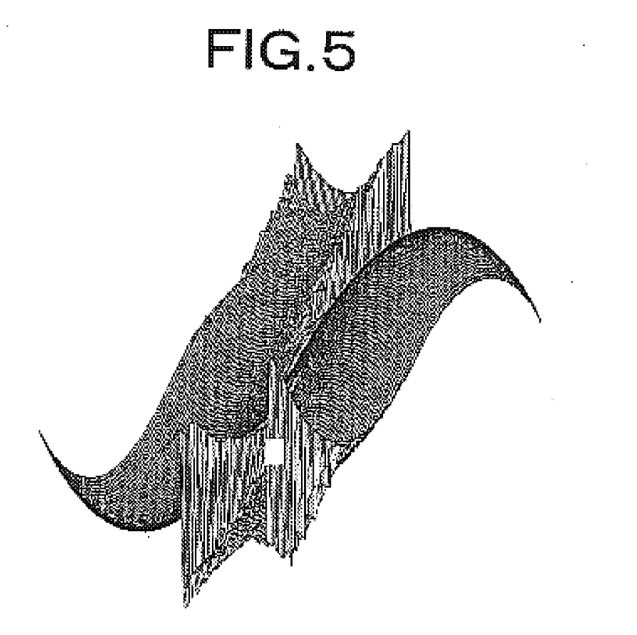
FIG. 5 is a view showing the recovered wavefront of the object to be observed determined by the conventional Fourier transform method from the Fourier spectrum shown in FIG. 4.

Namely, a wavefront such as that shown in FIG. 5 will be obtained when analyzed according to the conventional Fourier transform analysis method. As can be seen from FIG. 5, the obtained results yield a wavefront totally different from the original one to be observed.

Figure 6:
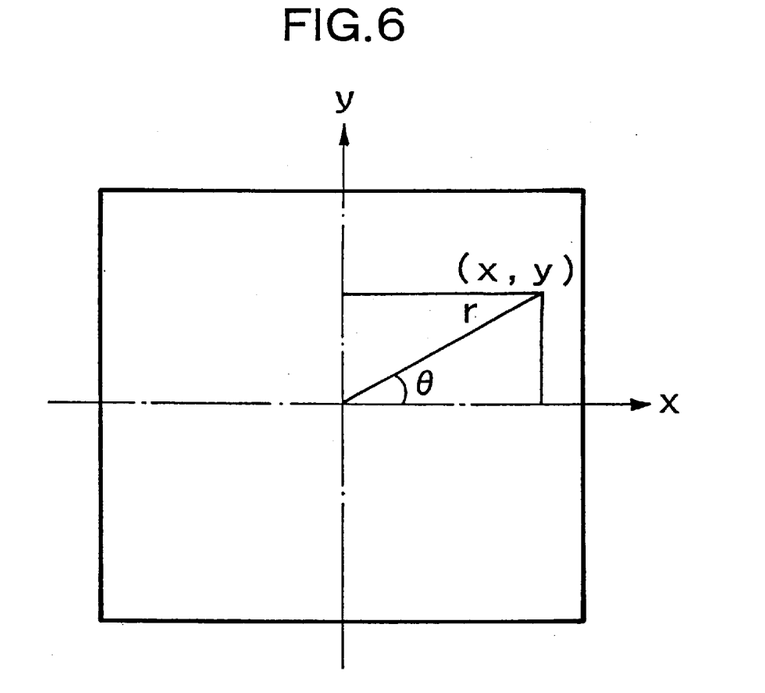
FIG. 6 is a chart showing coordinates of image data in an orthogonal coordinate system.
Figure 7:
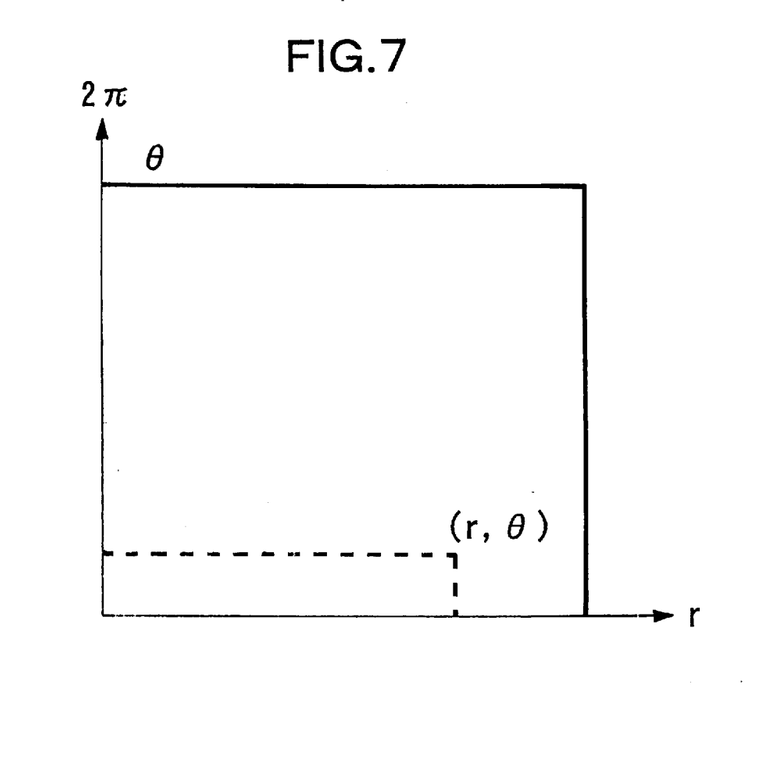
FIG. 7 is a chart showing coordinates of image data in a polar coordinate system.

Therefore, in the method of this embodiment, the fact that the most effective coordinate system representing a concentric circle pattern is a polar coordinate system is taken into consideration, and the interference fringe image data represented by a planar orthogonal coordinate system (x, y) are once converted into a planar polar coordinate system (r, θ), for example (see FIGS. 6 and 7).

As is well-known, the planar orthogonal coordinate system (x, y) and planar polar coordinate system (r, θ) have the following relationship therebetween:

$$x=r\cos\theta, y=r\sin\theta \qquad (1)$$

Here, the Fourier transform method on which the method of this embodiment is based will be explained.

Figure 12:
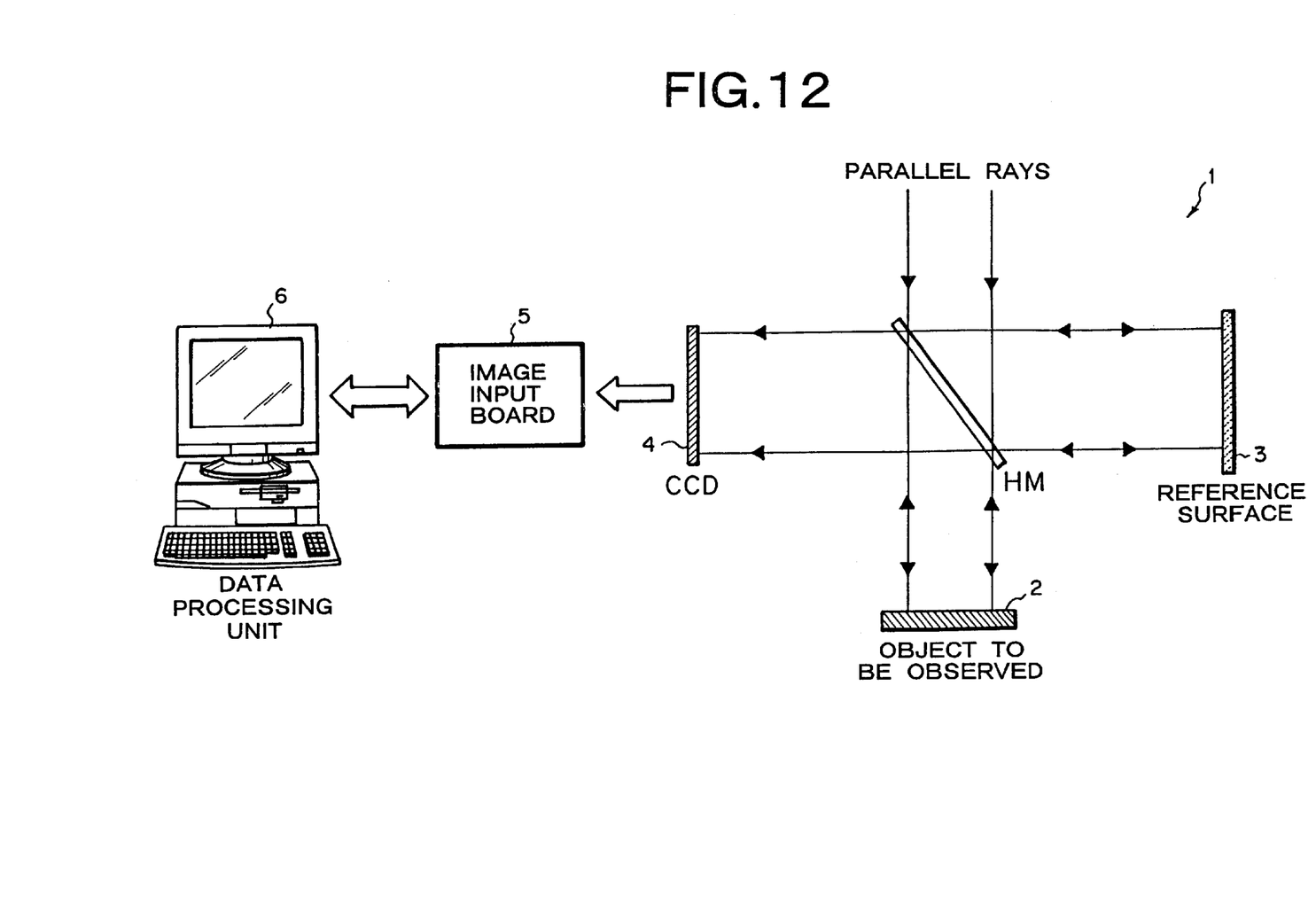
FIG. 12 is a schematic view showing an example of system for carrying out the method of the present invention.

As shown in FIG. 12, when a Michelson type interferometer 1 is used for measuring the wavefront of a surface 2 of an object to be observed in sub-fringe order, for example, a planar mirror acting as a reference surface 3 is tilted by a slight amount, so as to yield a minute angle θ of tilt. Though the object surface 2 can be tilted instead of the reference surface 3 in this case, it is preferred that the reference surface 3 be tilted.

In this case, the intensity distribution g(x, y) of interference fringe pattern concerning the object surface where the interference fringe pattern is formed become:

$$g(x,y)=a(x,y)+b(x,y)\cos[2\pi f_o x+\phi(x,y)], \qquad (2)$$

thus being those spatially phase-modulated by fine vertical fringes φ(x, y) which are carrier signals with a spatial frequency of $f_o=2\tan\theta/\lambda$. Here, a(x, y) is the term composed of the sum of intensities of two interfering light waves and indicates the intensity distribution in the background of interference fringe pattern, whereas b(x, y) is the term composed of the product of two interfering light waves and indicates the amplitude of changes in brightness of interference fringe pattern.

The above-mentioned low frequency signals φ(x, y), which are phase components to be determined, and unnecessary signals a(x, y) and b(x, y) are both spatial signals as with the carrier signals introduced by tilting.

The above-mentioned expression (2) is converted into the following expression (3):

$$g(x,y)=a(x,y)+c(x,y)\exp(2\pi jf_o x)+c^*(x,y)\exp(-2\pi jf_o x) \qquad (3)$$

where $$c(x,y)=(\tfrac{1}{2})c(x,y)\exp[j\phi(x,y)],$$

and * indicates a complex conjugate.

When only variable x is subjected to one-dimensional Fourier transform with y in the intensity distribution of expression (3) being fixed, so as to calculate the spatial frequency spectrum G(f, y) concerning variable x, the following expression (4) is obtained:

$$G(f, y) = \int_{-\infty}^{\infty} g(x, y)\exp(-2\pi j fx)dx \qquad (4)$$
$$= A(f, y) + C(f - f_0, y) + C*(f - f_0, y)$$

where capital letters indicate spatial frequency spectra concerning variable x.

As compared with the speed of change caused by the carrier spatial frequency $f_o$, the change in a(x, y) and b(x, y) is quite slow, and the change in $\phi(x, y)$ is also slow on the object surface in sub-fringe order.

Therefore, the three spectra in the above-mentioned expression (4) are completely separated from each other by the carrier frequency $f_o$.

Here, the spectrum $C(f-f_o, y)$ of the signal superimposed on the positive carrier frequency $f_o$ is taken out alone, and is shifted toward the origin by $f_o$, so as to yield C(f, y). This spatial frequency filtering eliminates one of the unnecessary signals, i.e., a(x, y); whereas the carrier frequency, i.e., tilt, is eliminated by the shifting of spectrum toward the origin.

When thus obtained C(f, y) is subjected to one-dimensional inverse Fourier transform as a variable of f, c(x, y) in the above-mentioned expression (3) is determined.

Thereafter, the following expression (5) represented by complex logarithms is calculated, so that the imaginary part is completely separated from unnecessary terms of the real part, whereby the phase $\phi(x, y)$ can be determined:

$$log[c(x,y)]=log[(\tfrac{1}{2})b(x,y)]+j\phi(x,y) \qquad (5)$$

Figure 1:
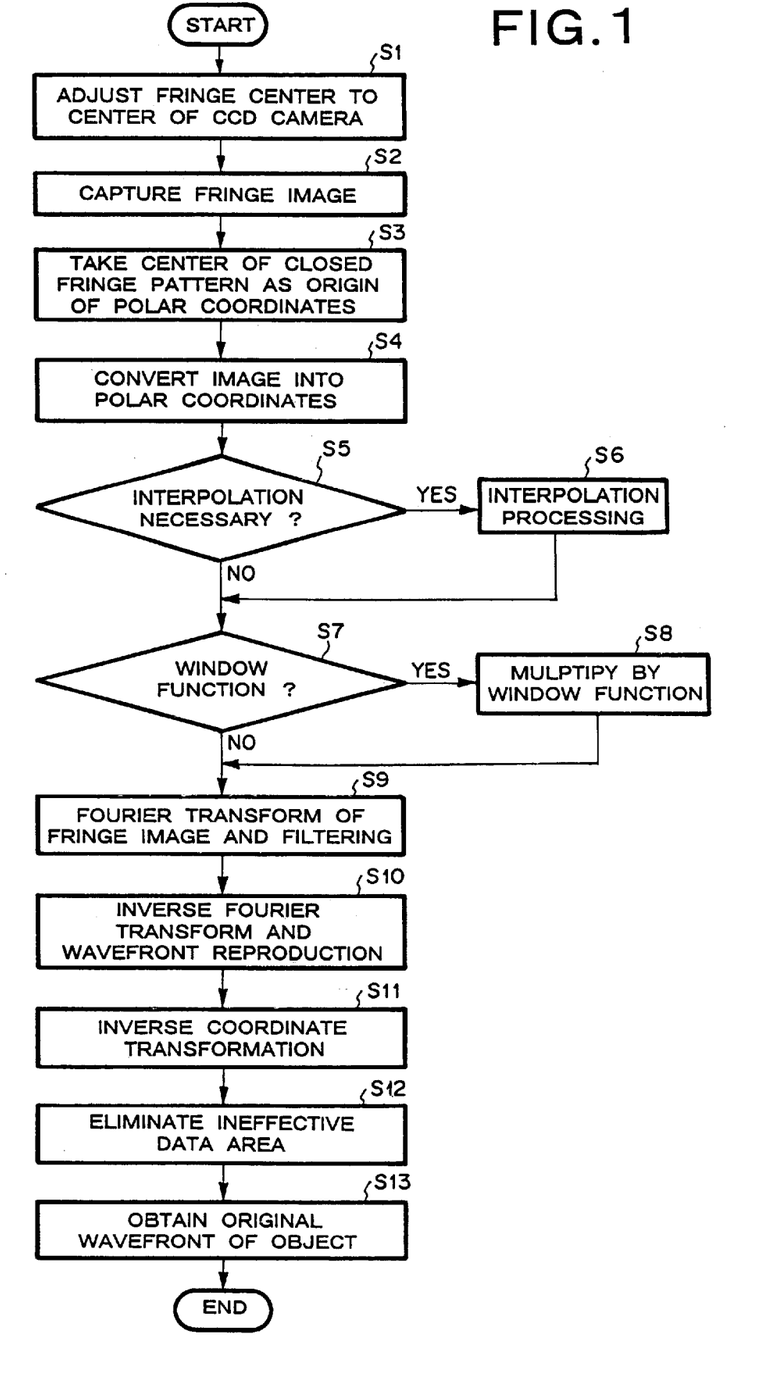
FIG. 1 is a flowchart for explaining an embodiment of the present invention.

This embodiment will now be explained with reference to the flowchart shown in FIG. 1.

In the Michelson type interferometer 1 such as the one shown in FIG. 12, interference fringe pattern (having a closed fringe pattern such as the one shown in FIG. 3) formed by respective reflected luminous fluxes from the object surface 2 (shaped like a spherical surface) and reference surface 3 are captured by a CCD camera 4, and are displayed on a monitor screen 6 by way of an image input board 5. The interference fringe image data from the CCD camera 4 are stored into the memory of a computer.

Here, while observing the monitor screen 6, the position of the object to be observed is adjusted such that the center of interference fringe pattern is located at the center of screen (S1).

Subsequently, the interference fringe image formed on the CCD camera 4 is captured upon photoelectric conversion, and thus obtained data are stored into the above-mentioned memory (S2).

Figure 8:
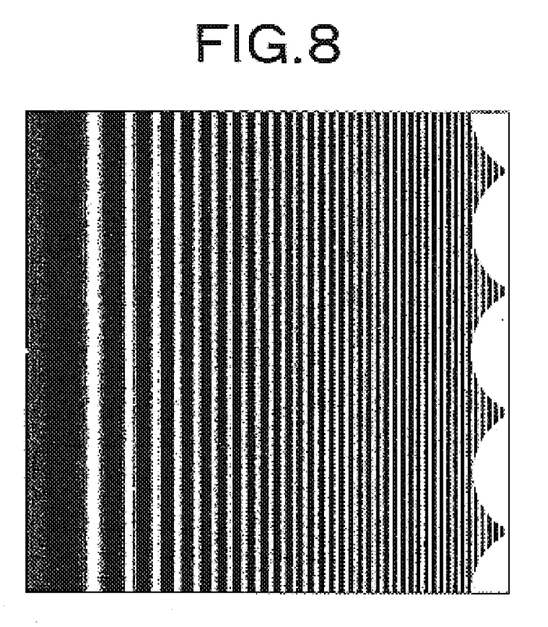
FIG. 8 is a view showing opened interference fringe pattern obtained when the closed interference fringe pattern shown in FIG. 3 are converted into a polar coordinate.

Then, the center of the closed fringe pattern is taken as the origin of the polar coordinate system in the fringe image data stored in the memory (S3), and the data are converted into fringe image data in the polar coordinate system (S4). Thus obtained fringe image data of the polar coordinate system yield an opened parallel fringe pattern as shown in FIG. 8, which is not a closed fringe pattern. This fact will be easily understood in concept when imagining a tree cake being opened from an incision formed at a side part thereof, so as to deform until its inner rings become substantially parallel lines.

Figure 9:
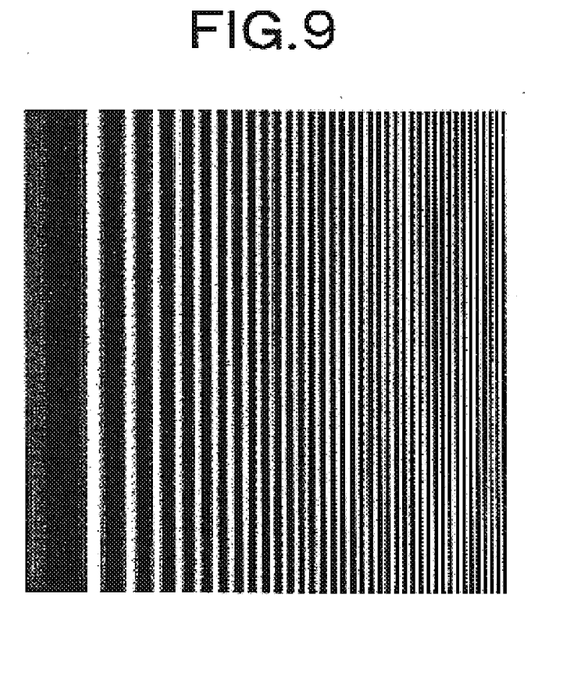
FIG. 9 is a view showing interference fringe pattern obtained when the ineffective data areas in the interference fringe pattern of FIG. 8 are filled by interpolation.

However, this coordinate transformation is not a linear transformation. Therefore, when square data suitable for Fourier transform in an orthogonal coordinate system are converted into a polar coordinate system, areas without effective data (ineffective data areas) such as those shown in FIG. 8 may occur at an end part thereof. The ineffective data areas may be neglected since they generate errors in analysis. For effectively utilizing these areas, however, they are filled with simulated data by using extrapolation techniques (S5, S6). FIG. 9 shows an interference fringe image obtained when the ineffective data areas are thus filled with by interpolation.

When carrying out the above-mentioned transformation by discrete Fourier transform (DFT), only integers are used. In order to represent interference fringe pattern expressed in discrete orthogonal coordinates by discrete polar coordinates, it is necessary that discrete data items be filled with simulated data by using interpolation techniques.

Subsequently, if necessary, the image data obtained by the processes of the above-mentioned steps 5, 6 (S5, S6) are multiplied by a predetermined window function (S7, S8).

If the carrier frequency of interference fringe pattern is not an integer, then error will be greater in marginal portions of the analysis image of the object to be observed. Therefore, the error in analysis can be reduced if the image data are multiplied by a known window function (e.g., a window function which yields a region excluding marginal portions of the image data).

When the interference fringe image data of an orthogonal coordinate system is converted into a polar coordinate system, the $\theta$ direction varies from 0 to $2\pi$, thereby corresponding to one period of a trigonometric function. Therefore, the multiplication by a window function is not necessary in the $\theta$ direction. Generally, the carrier frequency is not an integer in the r direction, therefore, it is desirable to be multiplied by a window function, so as to reduce the error in analysis.

Figure 10:
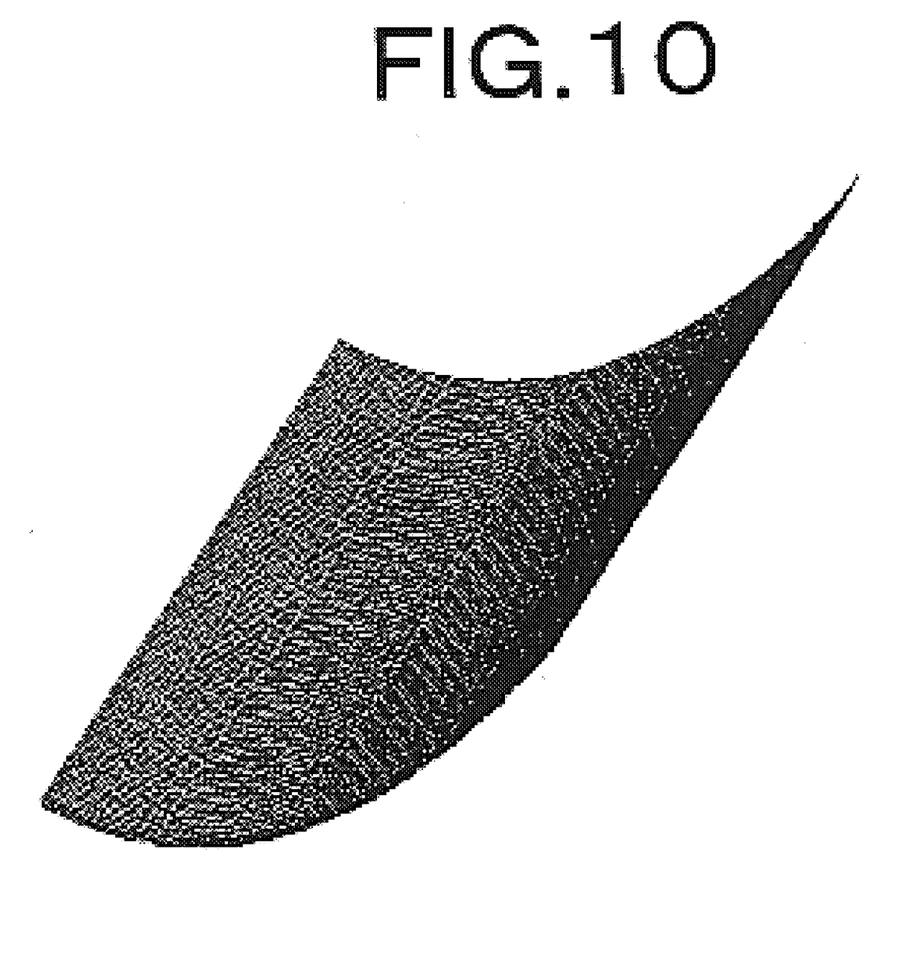
FIG. 10 is a view showing the recovered wavefront of the object to be observed that is obtained when the image data of the interference fringe pattern shown in FIG. 9 are analized by the conventional Fourier-transform method.

Thereafter, the interference fringe image data converted into the polar coordinate system are subjected to the well-known Fourier transform processing (S9). Since the obtained Fourier spectrum results from open interference fringe pattern, the lower frequency signal components and carrier frequency components can securely be separated from each other, whereby a polar coordinate form generated upon an interference fringe analysis, such as that shown in FIG. 10, is obtained (S10).

Then, the wavefront expressed in the polar coordinate system obtained at step 10 is converted into the orthogonal coordinate system by inverse coordinate transformation process (S11). If the data are filled at the above-mentioned step 6, then the ineffective data areas subjected to the filling are eliminated (S12), whereby the wavefront of the object to be observed (shaped like a spherical waveform) is obtained (S13).

Figure 11:
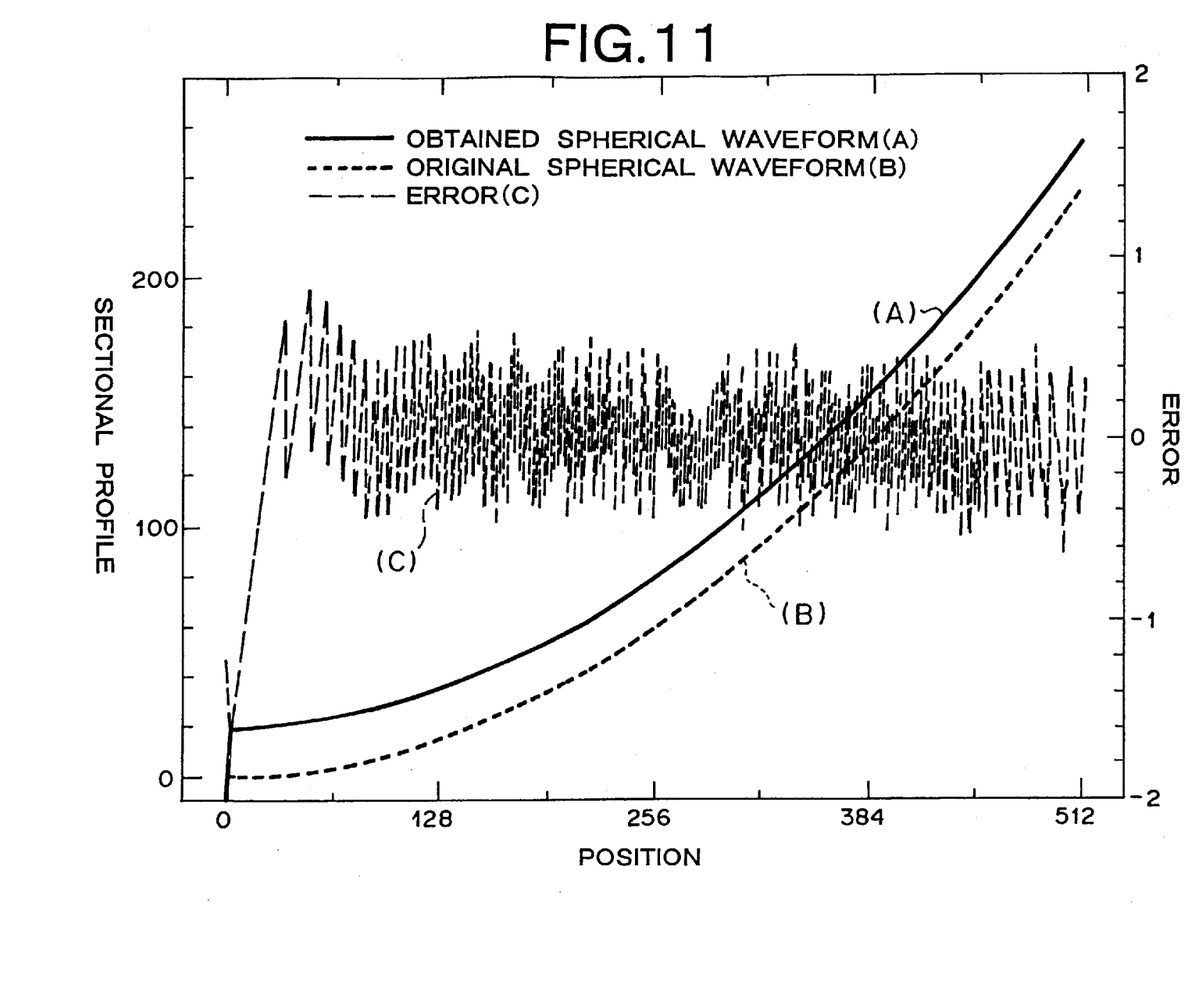
FIG. 11 is a chart showing a curve indicating an original cross section profile of the original spherical waveform to be analyzed, a curve showing the cross section of the profile (shaped like a spherical waveform) obtained by the method in accordance with an embodiment of the present invention, and the error therebetween.

FIG. 11 shows two curves (having a given unit) for comparing the original cross section profile of the wavefront and that of an object to be observed (shaped like a spherical waveform) determined by the method of this embodiment with each other, and the amount of error (%) therebetween. Here, the abscissa indicates the position (the number of CCD pixels).

As can be seen from FIG. 11, the above-mentioned error is about 0.3% or less than the spherical wave to be measured.

For further reducing such an error, the interference fringe image data are divided into two areas of $\theta=0$ to $\pi$, and $\theta=\pi$ to $2\pi$, and each area is converted into a polar coordinate system. Then, the respective interference fringe images of the two areas are combined together at a position of r=0. Since the respective interference fringe intensities of the interference fringe image data of both regions equal each other at the position of r=0 even after being converted into the polar coordinate system, thus obtained composite interference fringe image becomes continuous.

Without being restricted to the two areas mentioned above, the interference fringe data can be divided into any number of small areas. For example, closed interference fringe image data of an orthogonal coordinate system may be divided into four areas of θ=0 to π/2, θ=π/2 to π, θ=π to 3π/2, and θ=3π/2 to 2π, so that each area is converted into a polar coordinate system. In the case where a plurality of patterns exist on one interference fringe image, as in the case where a plurality of fringe centers exist, it is preferred that each divided area include a respective pattern and that the above-mentioned transformation be carried out for each area.

In this case, the θ direction does not become one period of a trigonometric function, whereby it is necessary that the θ direction be multiplied by a window function as well. Since the error in marginal portions of the determined form is still large even after being multiplied by the window function, influences of the error will remain at the time of combining. Therefore, it is desirable that areas have overlapping portions when dividing interference fringe pattern to be analyzed, and that the marginal portions of each area yielding a large error be eliminated at the time of combining.

Without being restricted to the above-mentioned embodiment, the fringe analysis method using Fourier transform in accordance with the present invention can be modified in various ways.

Though the interference fringe image is captured by a Michelson type interferometer in the above-mentioned embodiment, the present invention is similarly applicable to interference fringe image data obtained by interferometers of Fizeau type or other types as a matter of course.

Furthermore, the method of the present invention is applicable not only to interference fringe pattern, but also to various fringe images of moiré fringe pattern, speckle fringe pattern, and other fringe patterns in a similar manner.

Also, the method of the present invention is applicable to a partial analysis of closed fringe pattern.

Though the above-mentioned embodiment relates to a case using one-dimensional Fourier transform, two-dimensional Fourier transform can also be used.

Further, though the above-mentioned embodiment relates to a case where the object to be observed has a form similar to a spherical surface or parabolic surface, other surfaces which generate a closed fringe pattern can also be used as an object to be observed.

Also, though a polar coordinate system is used as a coordinate system different from the orthogonal coordinate system, various linear or nonlinear coordinate systems such as logarithmic coordinate systems, exponential coordinate systems, and others can be used.

In the fringe analysis method using Fourier transform in accordance with the present invention, fringe image data of an object to be observed expressed by an orthogonal coordinate system are converted into fringe image data represented by a polar coordinate system, thus converted data are subjected to Fourier transform, so that the fringe pattern is analyzed in the polar coordinate system, and the analysis data are finally converted back into an orthogonal coordinate system, so as to yield the wavefront of the object.

Namely, even when the fringe image data expressed by the orthogonal coordinate system form a closed fringe pattern, they can be turned into an open fringe pattern when converted into a polar coordinate system, whereby low frequency signal components and carrier frequency components can be securely separated from each other by the conventional Fourier transform method thereafter. When the wavefront data obtained after eliminating the carrier frequency components are returned to the orthogonal coordinate system, the original wavefront of the object to be observed can be obtained favorably.

What is claimed is:

1. A fringe analysis method comprising the steps of converting fringe image data of a wavefront to be observed which are expressed by an orthogonal coordinate system into fringe image data represented by a different coordinate system; by using the conventional Fourier transform method, wavefront expressed in the converted coordinate system can be obtained; and then converting said obtained wavefront in said converted coordinate system back into a wavefront expressed in the orignal orthogonal coordinate system.

2. A fringe analysis method according to claim 1, wherein said different coordinate system is a polar coordinate system.

3. A fringe analysis method according to claim 2, wherein said fringe image data expressed by said orthogonal coordinate system comprise a closed fringe pattern, the origin of said polar coordinate system is set within the innermost of the closed fringe pattern.

4. A fringe analysis method according to claim 3, wherein said origin is located near the center of said closed fringe pattern.

5. A fringe analysis method according to claim 1, wherein carrier fringe pattern is superimposed on fringe image data carrying phase information expressed by said orthogonal coordinate system.

6. A fringe analysis method according to claim 5, wherein said fringe image data are interference fringe image data, and carrier fringes caused by tilting a surface of said wavefront or the reference surface relatively with each other is superimposed on said interference fringe image data.

7. A fringe analysis method according to claim 1, wherein ineffective data areas of said fringe image data represented by said converted coordinate system are filled by interpolation, and then said Fourier transform method is applied to.

8. A fringe analysis method according to claim 1, wherein said fringe image data represented by said converted coordinate system is multiplied by a predetermined window function.

9. A fringe analysis method according to claim 1, wherein said fringe image data expressed by said original orthogonal coordinate system is divided into a plurality of data areas, each of thus divided areas is converted into fringe image data represented by said converted coordinate system, conventional Fourier transform method is used so as to obtain a wavefront corresponding to each area of said wavefront in said converted coordinate system, and then said wavefronts of said plurality of areas represented by said converted coordinate system are combined together.

10. A fringe analysis method according to claim 9, wherein said divided areas comprise a first angle area of $0 \leq \theta < \pi$ and a second angle area of $\pi \leq \theta < 2\pi$.

11. A fringe analysis method according to claim 9, wherein said divided areas comprise a first angle area of $$0 \leq \theta < \frac{\pi}{2},$$

a second angle area of $$\frac{\pi}{2} \leq \theta < \pi,$$

a third angle area of $$\pi \leq \theta < \frac{3\pi}{2},$$

and a fourth angle area of $$\frac{3\pi}{2} \leq \theta < 2\pi.$$

* * * * *